US012577694B2

(12) United States Patent
Jiang et al.

(10) Patent No.: US 12,577,694 B2
(45) Date of Patent: Mar. 17, 2026

(54) ALTERNATING CURRENT ELECTROLYSIS SYSTEM, AND METHOD AND DEVICE FOR CONTROLLING THE SAME

(71) Applicant: Sungrow Hydrogen Sci. & Tech. Co., Ltd., Hefei (CN)

(72) Inventors: Cai Jiang, Hefei (CN); Longlin Sun, Hefei (CN); Xing Zhang, Hefei (CN); Zixuan Guo, Hefei (CN)

(73) Assignee: Sungrow Hydrogen Sci. & Tech. Co., Ltd., Hefei (CN)

( * ) Notice: Subject to any disclaimer, the term of this patent is extended or adjusted under 35 U.S.C. 154(b) by 596 days.

(21) Appl. No.: 18/092,847

(22) Filed: Jan. 3, 2023

(65) Prior Publication Data

US 2023/0212765 A1     Jul. 6, 2023

(30) Foreign Application Priority Data

Jan. 4, 2022     (CN) .......................... 202210001858.4

(51) Int. Cl.
| | |
|---|---|
| *C25B 15/023* | (2021.01) |
| *C25B 9/65* | (2021.01) |
| *C25C 7/06* | (2006.01) |
| *H02J 3/38* | (2006.01) |

(52) U.S. Cl.
CPC .............. *C25B 15/023* (2021.01); *C25B 9/65* (2021.01); *C25C 7/06* (2013.01); *H02J 3/381* (2013.01); *H02J 2300/24* (2020.01)

(58) Field of Classification Search
CPC .............................. C25B 15/023; C25B 15/02
See application file for complete search history.

(56) References Cited

U.S. PATENT DOCUMENTS

| | | | |
|---|---|---|---|
| 2021/0317588 A1 | 10/2021 | Falk et al. | |
| 2023/0140438 A1* | 5/2023 | Damen | C25B 1/04 |
| | | | 307/11 |

FOREIGN PATENT DOCUMENTS

| | | | | |
|---|---|---|---|---|
| KR | 20200125483 A | * | 11/2020 | H02J 3/381 |
| KR | 10-2195169 B1 | | 12/2020 | |

OTHER PUBLICATIONS

Extended European Search Report for European Application No. 23150122.2, dated May 22, 2023.

* cited by examiner

*Primary Examiner* — Alexander W Keeling
(74) *Attorney, Agent, or Firm* — PV IP PC; Wei Te Chung

(57) ABSTRACT

An alternating current electrolysis system, as well as a method and a device for controlling the alternating current electrolysis system are provided. The method includes: acquiring a voltage amplitude at an alternating current side of an electrolysis rectification power supply; and modifying an output parameter of the electrolysis rectification power supply based on the voltage amplitude. Compared with the conventional technology, the problem of oscillation of a power grid due to unbalanced power of the alternating current electrolysis system is effectively solved, thereby facilitating normal operation of a electrolysis station.

20 Claims, 10 Drawing Sheets

700

701

702

Voltage amplitude
acquiring module

Output parameter
modifying module

ALTERNATING CURRENT ELECTROLYSIS SYSTEM, AND METHOD AND DEVICE FOR CONTROLLING THE SAME

This application claims priority to Chinese Patent Application No. 202210001858.4, titled "ALTERNATING CURRENT ELECTROLYSIS SYSTEM, AND METHOD AND DEVICE FOR CONTROLLING THE SAME", filed on Jan. 4, 2022 with the China National Intellectual Property Administration, which is incorporated herein by reference in its entirety.

FIELD

Embodiments of the present disclosure relate to the technical field of alternating current electrolysis, and in particular to an alternating current electrolysis system, and a method and a device for controlling the alternating current electrolysis system.

BACKGROUND

With changes in global energy pattern, photovoltaic power generation and wind power generation increasingly become focus for in-depth research and vigorous development in various countries. Since renewable energy such as solar energy and wind energy is intermittent, a renewable energy power station such as a photovoltaic power station and a wind power station has a problem of instability in power. Therefore, an alternating current grid including the renewable energy power station has a problem of large fluctuations, which also exists in connecting the renewable energy power station to an alternating current electrolysis system. The alternating current electrolysis system includes an electrolysis station, and the electrolysis station rectifies a voltage of the alternating current grid into direct current power for electrolysis. During the operation of the electrolysis station, however, a fluctuation in an output power of the renewable energy power station easily results in an unbalanced power of the alternating current electrolysis system, and then results in oscillations of the alternating current grid, which affects the normal operation of the electrolysis station.

SUMMARY

An alternating current electrolysis system, as well as a method and a device for controlling the alternating current electrolysis system are provided according to embodiments of the present disclosure, so as to solve the problems of unbalanced power of the alternating current electrolysis system and oscillations of the alternating current grid, thereby facilitating normal operation of an electrolysis station.

In a first aspect, a method for controlling an alternating-current electrolysis system is provided according to an embodiment of the present disclosure. The method for controlling an alternating current electrolysis system includes: acquiring a voltage amplitude at an alternating current side of an electrolysis rectification power supply; and modifying an output parameter of the electrolysis rectification power supply based on the voltage amplitude.

In an embodiment, the method for controlling an alternating current electrolysis system further includes acquiring an execution instruction for the electrolysis rectification power supply and an actual instruction at a previous cycle. The modifying an output parameter includes: setting a first threshold and a second threshold, where the first threshold is greater than the second threshold; modifying the output parameter of the electrolysis rectification power supply based on the execution instruction in a case that the voltage amplitude is greater than or equal to the first threshold; modifying the output parameter of the electrolysis rectification power supply based on the actual instruction at the previous cycle in a case that the voltage amplitude is between the first threshold and the second threshold; and modifying the output parameter of the electrolysis rectification power supply to be less than an output parameter at the previous cycle in a case that the voltage amplitude is less than the second threshold.

In an embodiment, the method for controlling an alternating current electrolysis system further includes: acquiring an execution instruction for the electrolysis rectification power supply. The modifying an output parameter includes: setting a first threshold; modifying the output parameter of the electrolysis rectification power supply based on the execution instruction in a case that the voltage amplitude is greater than or equal to the first threshold; and modifying the output parameter of the electrolysis rectification power supply to be less than an output parameter at a previous cycle in a case that the voltage amplitude is less than the first threshold.

In an embodiment, the modifying the output parameter of the electrolysis rectification power supply to be less than an output parameter at a previous cycle includes at least one of: modifying the execution instruction with an actual instruction at the previous cycle as a reference, to modify the output parameter of the electrolysis rectification power supply to be less than the output parameter at the previous cycle; and modifying a duty cycle of a PWM signal received by the electrolysis rectification power supply, to modify the output parameter of the electrolysis rectification power supply to be less than the output parameter at the previous cycle, where the actual instruction at the previous cycle and the execution instruction each are converted into the PWM signal to control the electrolysis rectification power supply.

In an embodiment, in a case of both the modifying the execution instruction and the modifying a duty cycle of a PWM signal, one of the modifying the execution instruction and the modifying a duty cycle of a PWM signal based on which the output parameter of the electrolysis rectification power supply is modified to be smaller prevails.

In an embodiment, the duty cycle of the PWM signal is determined by: calculating the duty cycle of the PWM signal by substituting the voltage amplitude into a first monotone nonincreasing function in a case that the electrolysis rectification power supply is a voltage source rectifier, the duty cycle of the PWM signal is constant, the voltage amplitude and an output voltage of the electrolysis rectification power supply form a first monotone nondecreasing function, the duty cycle of the PWM signal and the voltage amplitude form the first monotone nonincreasing function; calculating the duty cycle of the PWM signal by substituting the voltage amplitude into a second monotone nondecreasing function in a case that the electrolysis rectification power supply is a voltage source rectifier, the duty cycle of the PWM signal is constant, the voltage amplitude and an output voltage of the electrolysis rectification power supply form a second monotone nonincreasing function, and the duty cycle of the PWM signal and the voltage amplitude form the second monotone nondecreasing function; calculating the duty cycle of the PWM signal by substituting the voltage amplitude into a third monotone nonincreasing function in a case that the electrolysis rectification power supply is the current source rectifier, the duty cycle of the PWM signal is constant, the voltage amplitude and the output current of the electrolysis rectification power supply form a third monotone nondecreasing function, and the duty cycle of the PWM signal and the voltage amplitude form the third monotone nonincreasing function; and calculating the duty cycle of the PWM signal by substituting the voltage amplitude into a fourth monotone nondecreasing function in a case that the electrolysis rectification power supply is the current source rectifier, the duty cycle of the PWM signal is constant, the voltage amplitude and the output current of the electrolysis rectification power supply form a fourth monotone nonincreasing function, and the duty cycle of the PWM signal and the voltage amplitude form the fourth monotone nondecreasing function.

In an embodiment, the method for controlling an alternating current electrolysis system further includes acquiring an execution instruction for the electrolysis rectification power supply. The modifying an output parameter includes: calculating an upper limit of the output parameter based on the voltage amplitude; controlling the electrolysis rectification power supply to output the upper limit of the output parameter in a case that an output parameter corresponding to the execution instruction is greater than the upper limit of the output parameter; and modifying the output parameter of the electrolysis rectification power supply based on the execution instruction, in a case that an output parameter corresponding to the execution instruction is less than or equal to the upper limit of the output parameter.

In an embodiment, the voltage amplitude and the upper limit of the output parameter form a monotone nondecreasing function, and the upper limit of the output parameter is calculated by substituting the voltage amplitude into the monotone nondecreasing function.

In an embodiment, the modifying an output parameter includes: calculating a value corresponding to an execution instruction based on the voltage amplitude; and modifying the output parameter of the electrolysis rectification power supply based on the value corresponding to the execution instruction.

In an embodiment, the voltage amplitude corresponding to the value of the execution instruction form a monotone nondecreasing function, and the value corresponding to the execution instruction is calculated by substituting the voltage amplitude into the monotone nondecreasing function.

In an embodiment, a coefficient in the monotone nondecreasing function depends on a rated value of the voltage amplitude and a rated value of the output parameter.

In an embodiment, the output parameter includes at least one of an output power, an output voltage and an output current.

In an embodiment, the acquiring a voltage amplitude includes: detecting instantaneous voltages of three phases at the alternating current side of the electrolysis rectification power supply; and calculating the voltage amplitude based on the instantaneous voltages of the three phases.

In a second aspect, a device for controlling an alternating current electrolysis system is further provided according to of the embodiments of the present disclosure. The device for controlling an alternating current electrolysis system includes: a voltage amplitude acquiring module configured to acquire a voltage amplitude at an alternating current side of an electrolysis rectification power supply; and an output parameter modifying module configured to modify an output parameter of the electrolysis rectification power supply based on the voltage amplitude.

In a third aspect, an alternating current electrolysis system is further provided according to of the embodiments of the present disclosure. The alternating current electrolysis system includes a renewable energy power station and an electrolysis station. The electrolysis station includes an electrolyzer, an electrolysis rectification power supply and a controller. The electrolysis rectification power supply is connected between the renewable energy power station and the electrolyzer. The controller is configured to perform the method for controlling an alternating current electrolysis system according to any one of the embodiments of the present disclosure.

In an embodiment, the renewable energy power station includes at least one of a photovoltaic power station and a wind power station.

In an embodiment, the electrolysis station further includes an alternating current switch cabinet and a transformer that are connected in series between the renewable energy power station and the electrolysis rectification power supply. the voltage amplitude is one of an amplitude of an alternating current voltage at an input end of the alternating current switch cabinet, an amplitude of an alternating current voltage at a primary side of the transformer, and an amplitude of a voltage at a secondary side of the transformer.

With the method for controlling an alternating current electrolysis system according to embodiments of the present disclosure, a voltage amplitude at an alternating current side of the electrolysis rectification power supply is acquired, and an output parameter of the electrolysis rectification power supply is modified based on the voltage amplitude, so that the electrolysis power of the electrolysis station matches the power of the alternating current grid. Therefore, according to the embodiments of the present disclosure, the electrolysis rectification power supply can be timely controlled to adapt to a fluctuation in the power of the alternating current grid, so as to solve the problem of the oscillation of the power grid due to the unbalanced power of the alternating current electrolysis system, thereby facilitating normal operation of the electrolysis station.

DETAILED DESCRIPTION

Figure 1:
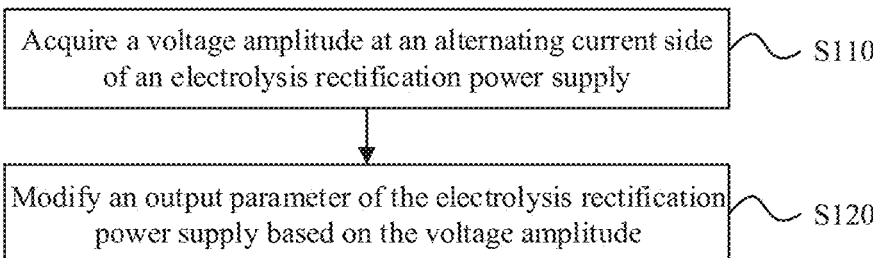
FIG. 1 is a flow chart illustrating a method for controlling an alternating current electrolysis system according to an embodiment of the present disclosure.

Hereinafter, the present disclosure is further described in detail in conjunction with drawings and embodiments. It should be understood that the embodiments described herein are only for explaining the present disclosure, rather than limiting the present disclosure. In addition, it should be noted that, for ease of description, only some of structures related to the present disclosure, rather than all of the structures, are show in the drawings.

FIG. 1 is a flow chart illustrating a method for controlling an alternating current electrolysis system according to an embodiment of the present disclosure. The method for controlling an alternating current electrolysis system may be performed by a device for controlling the alternating current electrolysis system. The device may be implemented by software and/or hardware. As shown in FIG. 1, the method includes the following steps S110 to S120.

In step S110, a voltage amplitude at an alternating current side of an electrolysis rectification power supply is acquired.

An electrolysis station is a station powered by direct current power for performing electrolysis. For example, the electrolysis station may be configured to perform electrolysis to produce hydrogen, copper, and the like. The electrolysis rectification power supply is a rectifier that supplies power to the electrolysis station, and is configured to convert alternating current power of an alternating current grid into direct current power. The electrolysis rectification power supply may be a voltage source rectifier (VSR) or a current source rectifier (CSR). The electrolysis rectification power supply, which is the voltage source rectifier or the current source rectifier, includes a semiconductor switching device. A direction of a voltage or current is controlled by controlling the semiconductor switching device to be turned on or off. For example, in order to control the electrolysis rectification power supply, a PWM signal is generated according to an execution instruction in a two-stage loop manner, to control the semiconductor switching device to be turned on or off. A difference between the voltage source rectifier and the current source rectifier is that filtering is performed by a capacitor at a direct current side of the voltage source rectifier, and an inductor serve as an energy storage component at an output end of the current source rectifier.

The voltage amplitude is an absolute value of a maximum instantaneous voltage of the alternating current power in one cycle, and is also a half of a distance from a wave peak to a wave trough in a sinusoidal wave. For example, the voltage amplitude is acquired by: detecting instantaneous voltages of three phases at the alternating current side of the electrolysis rectification power supply; and calculating the voltage amplitude based on the instantaneous voltages. The instantaneous voltages may be detected by a transformer or other detection device, and the voltage amplitude may be calculated based on the instantaneous voltages by utilizing a phase-locked loop algorithm.

In step S120, an output parameter of the electrolysis rectification power supply is modified based on the voltage amplitude.

A power provided by the alternating current grid varies with the voltage amplitude, and an electrolysis power of the electrolysis station is expected to match the power of the alternating current grid. A small voltage amplitude corresponds to a large electrolysis power of the electrolysis station, and a large voltage amplitude corresponds to a small electrolysis power of the electrolysis station, both of which may result in an unbalanced power of the alternating current electrolysis system, and then result in oscillation of the alternating current grid.

In order to modify the output parameter of the electrolysis rectification power supply, for example, the execution instruction may be modified, or a duty cycle of the PWM signal may be directly modified so as to modify an operation state of the electrolysis rectification power supply. The output parameter may be, for example, at least one of an output power, an output voltage, output current, and the like. Accordingly, the execution instruction is at least one of an output electrolysis power execution instruction Pref, an output voltage execution instruction Vref, an output current execution instruction Iref, and the like.

In summary, with the method for controlling an alternating current electrolysis system according to the embodiment of the present disclosure, a voltage amplitude at an alternating current side of the electrolysis rectification power supply is acquired, and an output parameter of the electrolysis rectification power supply is modified based on the voltage amplitude, so that the electrolysis power of the electrolysis station matches the power of the alternating current grid. Therefore, according to the embodiment of the present disclosure, the electrolysis rectification power supply can be timely controlled to adapt to a fluctuation in the power of the alternating current grid, so as to solve the problem of the oscillation of the power grid due to the unbalanced power of the alternating current electrolysis system.

In the above embodiment, the output parameter of the electrolysis rectification power supply is modified based on the voltage amplitude in various manners, some of which are described below without limiting the present disclosure.

In an embodiment of the present disclosure, the method for controlling an alternating current electrolysis system further includes: acquiring an execution instruction for the electrolysis rectification power supply and an actual instruction at a previous cycle. The output parameter is modified by: setting a first threshold and a second threshold, where the first threshold is greater than the second threshold; modifying the output parameter of the electrolysis rectification power supply based on the execution instruction in a case that the voltage amplitude is greater than or equal to the first threshold; modifying the output parameter of the electrolysis rectification power supply based on the actual instruction at the previous cycle in a case that the voltage amplitude ranges between the first threshold and the second threshold; and modifying the output parameter of the electrolysis rectification power supply to be less than an output parameter at the previous cycle in a case that the voltage amplitude is less than the second threshold.

The voltage amplitude falls into a range depending on the first threshold and the second threshold. There may be three cases, namely, a first case that the voltage amplitude is greater than the first threshold value (a first range), a second case that the voltage amplitude ranges between the first threshold and the second threshold (a second range), and a third case that the voltage amplitude is less than the second threshold (a third range). A value of the threshold may be set as required. For example, a case that the voltage amplitude is equal to the first threshold may be included in the first range or the second range, and a case that the voltage amplitude is equal to the second threshold may be included in the second range or the third range. For example, the first threshold may be equal to 90% of a rated value of the voltage amplitude, and the second threshold may be equal to 80% of the rated value of the voltage amplitude.

Figure 2:
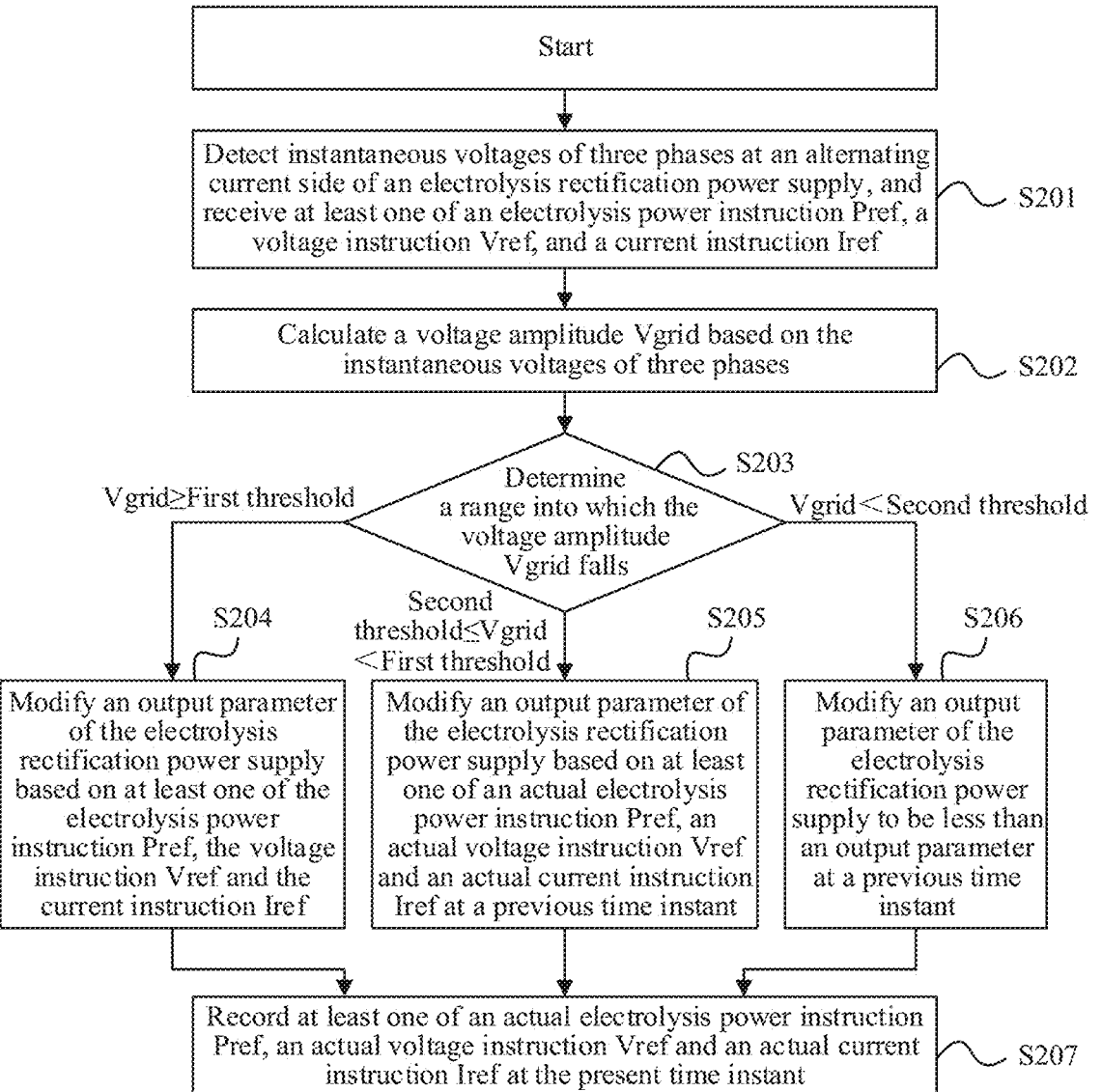
FIG. 2 is a flow chart illustrating a method for controlling an alternating current electrolysis system according to another embodiment of the present disclosure.

FIG. 2 is a flow chart illustrating a method for controlling an alternating current electrolysis system according to another embodiment of the present disclosure. As shown in FIG. 2, the method for controlling an alternating current electrolysis system includes the following steps S201 to S207.

In step S201, instantaneous voltages of three phases at the alternating current side of the electrolysis rectification power supply are detected, and at least one of an electrolysis power instruction Pref, a voltage instruction Vref, and a current instruction Iref is received.

In step S202, a voltage amplitude Vgrid is calculated based on the instantaneous voltages of the three phases.

In step S203, a range into which the voltage amplitude Vgrid falls is determined. In a case that the voltage amplitude Vgrid is greater than or equal to the first threshold, step S204 is performed. In a case that the voltage amplitude Vgrid is greater than or equal to the second threshold and less than the first threshold, step S205 is performed. In a case that the voltage amplitude Vgrid is less than the second threshold, step S206 is performed.

In step S204, an output parameter of the electrolysis rectification power supply is modified based on at least one of the electrolysis power instruction Pref, the voltage instruction Vref and the current instruction Iref.

The voltage amplitude Vgrid being greater than or equal to the first threshold indicates that the voltage amplitude Vgrid approximates the rated value, and therefore meets the requirements of the output parameter of the electrolysis station. Therefore, the electrolysis rectification power supply is controlled based on the execution instruction.

In step S205, the output parameter of the electrolysis rectification power supply is modified based on at least one of an actual electrolysis power instruction Pref, an actual voltage instruction Vref and an actual current instruction Iref at the previous cycle.

The voltage amplitude Vgrid ranging between the first threshold and the second threshold indicates that the voltage amplitude Vgrid is slightly less than the rated value. In such case, the electrolysis rectification power supply remains in the operation state at the previous cycle. In this way, the electrolysis station remains in an efficient operation state on the base that the electrolysis power of the electrolysis station substantially matches the power of the alternating current grid. Therefore, in this case, the electrolysis rectification power supply is controlled based on the actual instruction at the previous cycle.

In step S206, the output parameter of the electrolysis rectification power supply is modified to be less than the output parameter at the previous cycle.

The voltage amplitude Vgrid being less than the second threshold indicates that the voltage amplitude Vgrid is significantly low. In this case, the output parameter of the electrolysis rectification power supply is expected to be reduced so that the electrolysis power of the electrolysis station matches the power of the alternating current grid. In addition, according to the embodiment of the present disclosure, the output parameter of the electrolysis rectification power supply is modified to be less than the output parameter at the previous cycle, that is, the output parameter of the electrolysis rectification power supply is modified to be gradually reduced, thereby facilitating the stable operation of the electrolysis rectification power supply. For example, a value of the execution instruction is reduced based on the actual instruction at the previous cycle, so as to decrease the output parameter of the electrolysis rectification power supply.

In step S207, at least one of an actual electrolysis power instruction Pref, an actual voltage instruction Vref and an actual current instruction Iref at the present time instant is recorded.

It can be seen from steps S201 to S207 that in the embodiment of the present disclosure, a range into which the voltage amplitude falls is determined, and the execution instruction is modified depending on the range. Further, the electrolysis rectification power supply is gradually controlled according to the embodiment of the present disclosure, so that the electrolysis rectification power supply can stably operate while the electrolysis power of the electrolysis station matches the power of the alternating current grid.

In the above embodiment, two thresholds, namely the first threshold and the second threshold, as well as three ranges are set, which are not indented to limit the present disclosure. In another embodiment, the first threshold is equal to the second threshold, and therefore the three ranges is simplified into two ranges, that is, a case that the voltage amplitude is greater than the first threshold (a first range), and a case that the voltage amplitude is less than the first threshold (a second range). A value of the threshold may be set as required. For example, a case that the voltage amplitude is equal to the first threshold may be included in the first range or the second range. For example, the first threshold may be equal to 90% of a rated value of the voltage amplitude.

For example, the method for controlling an alternating current electrolysis system further includes: acquiring an execution instruction for the electrolysis rectification power supply. The output parameter is modified by: setting a first threshold; modifying the output parameter of the electrolysis rectification power supply based on the execution instruction in a case that the voltage amplitude is greater than or equal to the first threshold; and modifying the output parameter of the electrolysis rectification power supply to be less than the output parameter at the previous cycle in a case that the voltage amplitude is less than the first threshold.

Figure 3:
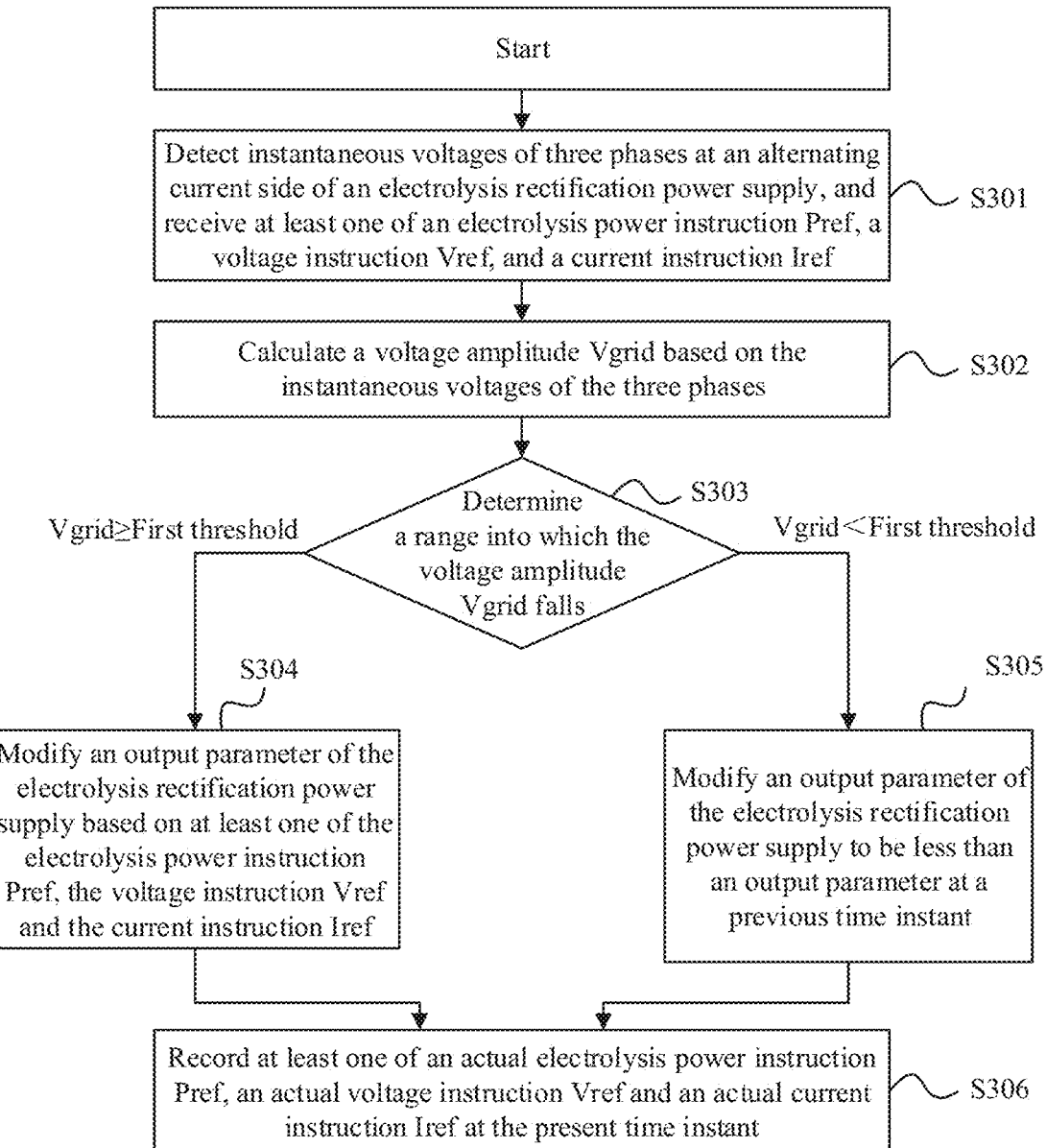
FIG. 3 is a flow chart illustrating a method for controlling an alternating current electrolysis system according to another embodiment of the present disclosure.

FIG. 3 is a flow chart illustrating a method for controlling an alternating current electrolysis system according to another embodiment of the present disclosure. As shown in FIG. 3, the method for controlling an alternating current electrolysis system includes the following steps S301 to S306.

In step S301, instantaneous voltages of three phases at an alternating current side of an electrolysis rectification power supply are detected, and at least one of an electrolysis power instruction Pref, a voltage instruction Vref, and a current instruction Iref is received.

In step S302, a voltage amplitude Vgrid is calculated based on the instantaneous voltages of the three phases.

In step S303, a range into which the voltage amplitude Vgrid falls is determined. In a case that the voltage amplitude Vgrid is greater than or equal to the first threshold, step S304 is performed. In a case that the voltage amplitude Vgrid is less than the first threshold, step S305 is performed.

In step S304, an output parameter of the electrolysis rectification power supply is modified based on at least one of the electrolysis power instruction Pref, the voltage instruction Vref and the current instruction Iref.

The voltage amplitude Vgrid being greater than or equal to the first threshold indicates that the voltage amplitude Vgrid approximates the rated value, and therefore meets the requirements of the output parameter of the electrolysis station. Therefore, the electrolysis rectification power supply is controlled based on the execution instruction.

In step S305, the output parameter of the electrolysis rectification power supply is modified to be less than the output parameter at the previous cycle.

The voltage amplitude Vgrid being less than the first threshold indicates that the voltage amplitude Vgrid is relatively low and thus fails to meet the requirements of the output parameter of the electrolysis station. The output parameter of the electrolysis rectification power supply is expected to be reduced so that the electrolysis power of the electrolysis station matches the power of the alternating current grid. In addition, according to the embodiment of the present disclosure, the output parameter of the electrolysis rectification power supply is modified to be less than the output parameter at the previous cycle, that is, the output parameter of the electrolysis rectification power supply is modified to be gradually reduced, thereby facilitating the stable operation of the electrolysis rectification power supply. For example, a value of the execution instruction is reduced based on the actual instruction at the previous cycle, so as to decrease the output parameter of the electrolysis rectification power supply.

In step S306, at least one of an actual electrolysis power instruction Pref, an actual voltage instruction Vref and an actual current instruction Iref at the present time instant is recorded.

It can be seen from steps S301 to S306 that in the embodiment of the present disclosure, a range into which the voltage amplitude falls is determined, and the execution instruction is modified depending on the range. Further, the electrolysis rectification power supply is gradually controlled according to the embodiment of the present disclosure, so that the electrolysis rectification power supply can stably operate while the electrolysis power of the electrolysis station matches the power of the alternating current grid.

In the above embodiment, the output parameter of the electrolysis rectification power supply is modified to be less than the output parameter at the previous cycle in various manners, some of which are described below without limiting the present disclosure.

In an embodiment of the present disclosure, the output parameter of the electrolysis rectification power supply is modified to be less than the output parameter at the previous cycle by: modifying the execution instruction with an actual instruction at the previous cycle as a reference, so as to modify the output parameter of the electrolysis rectification power supply to be less than the output parameter at the previous cycle. The execution instruction is modified with the actual instruction at the previous cycle as the reference, so as to modify the output parameter of the electrolysis rectification power supply to be less than the output parameter at the previous cycle. the actual instruction at the previous cycle may be converted into a PWM signal. The semiconductor switching device in the electrolysis rectification power supply is controlled based on the PWM signal, so that the output parameter of the electrolysis rectification power supply is modified based on an on-off state of the semiconductor switching device.

Alternatively, the output parameter of the electrolysis rectification power supply is further modified to be less than the output parameter at the previous cycle by: modifying a duty cycle of the PWM signal received by the electrolysis rectification power supply so as to modify the output parameter of the electrolysis rectification power supply to be less than the output parameter at the previous cycle. The duty cycle of the PWM signal is directly modified, so that the converting the execution instruction into the PWM signal is unnecessary, which is more direct, thereby helping to improve a response speed of the electrolysis rectification power supply.

It can be seen that the output parameter of the electrolysis rectification power supply may be modified in one or both of the above two manners.

In an embodiment, both the execution instruction and the duty cycle of the PWM signal are modified, and the one based on which the output parameter of the electrolysis rectification power supply is modified to be smaller prevails. The execution instruction and the duty cycle of the PWM signal are modified in respective manners different from each other, and therefore have respective results different from each other. In such case, the one based on which the output parameter of the electrolysis rectification power supply is modified to be smaller prevails, so that not only the electrolysis power of the electrolysis station matches the power of the alternating current grid, but also the electrolysis rectification power supply can operate stably.

Based on the above embodiments, those skilled in the art should understand that the output voltage of the electrolysis rectification power supply is not only related to the voltage amplitude but also related to the duty cycle of the PWM signal. Therefore, the output voltage of the electrolysis rectification power supply can be modified by modifying the duty cycle of the PWM signal or the voltage amplitude. In a case that the voltage amplitude fluctuates, the output voltage of the electrolysis rectification power supply can remain constant by modifying the duty cycle of the PWM signal. In a case that the voltage amplitude is constant, a relationship between the duty cycle of the PWM signal and the output voltage of the electrolysis rectification power supply is in various forms, depending on a topology. It is found from research that, however, a functional relationship between the duty cycle of the PWM signal and the voltage amplitude Vgrid is constant. That is, in a case that the voltage amplitude Vgrid fluctuates, the output voltage of the electrolysis rectification power supply is modified to be constant by modifying the duty cycle of the PWM signal. The functional relationship between the duty cycle of the PWM signal and the voltage amplitude Vgrid is defined below depending on a type of the electrolysis rectification power supply, so as to determine the duty cycle of the PWM signal.

In an embodiment, the electrolysis rectification power supply is a voltage source rectifier. In a case that duty cycle of the PWM signal is constant, the voltage amplitude and the output voltage of the electrolysis rectification power supply form a first monotone nondecreasing function. Therefore, the duty cycle of the PWM signal and the voltage amplitude form a first monotone nonincreasing function. The duty cycle of the PWM signal is calculated by substituting the voltage amplitude into the first monotone nonincreasing function.

The monotone nondecreasing function is defined as that for a function $f(x)$, there is constantly a relationship of $f(x1) \geq f(x2)$ for two independent variables x1 and x2 and $x1 > x2$. The monotone nonincreasing function is defined as that for a function $f(x)$, there is constantly a relationship of $f(x1) \leq f(x2)$ for two independent variables x1 and x2 and $x1 > x2$. In a case that the duty cycle duty of the PWM signal is constant, the voltage amplitude Vgrid and the output voltage of the electrolysis rectification power supply form the first monotone nondecreasing function, which indicates that the output voltage of the electrolysis rectification power supply increases as the voltage amplitude Vgrid increases. The duty cycle of the PWM signal and the voltage amplitude form the first monotone nonincreasing function, which indicates that the duty cycle of the PWM signal decreases as the voltage amplitude Vgrid increases.

In an embodiment, the electrolysis rectification power supply is the voltage source rectifier. In a case that the duty cycle of the PWM signal is constant, the voltage amplitude and the output voltage of the electrolysis rectification power supply form a second monotone nonincreasing function. Therefore, the duty cycle of the PWM signal and the voltage amplitude form a second monotone nondecreasing function. The duty cycle of the PWM signal is calculated by substituting the voltage amplitude into the second monotone nondecreasing function.

In another embodiment, the electrolysis rectification power supply is the current source rectifier. In a case that the duty cycle of the PWM signal is constant, the voltage amplitude and the output current of the electrolysis rectification power supply form a third monotone nondecreasing function. Therefore, the duty cycle of the PWM signal and the voltage amplitude form a third monotone nonincreasing function. The duty cycle of the PWM signal is calculated by substituting the voltage amplitude into the third monotone nonincreasing function.

In another embodiment, the electrolysis rectification power supply is the current source rectifier. In a case that the duty cycle of the PWM signal is constant, the voltage amplitude and the output current of the electrolysis rectification power supply form a fourth monotone nonincreasing function. Therefore, the duty cycle of the PWM signal and the voltage amplitude form a fourth monotone nondecreasing function. The voltage amplitude is substituted into the fourth monotone nondecreasing function to calculate the duty cycle of the PWM signal.

In an embodiment of the present disclosure, the method for controlling an alternating current electrolysis system further includes: acquiring an execution instruction for the electrolysis rectification power supply. The output parameter is modified by: calculating an upper limit of the output parameter based on the voltage amplitude; controlling the electrolysis rectification power supply to output the upper limit of the output parameter in a case that an output parameter corresponding to the execution instruction is greater than the upper limit of the output parameter; and modifying the output parameter of the electrolysis rectification power supply based on the execution instruction in a case that the output parameter corresponding to the execution instruction is less than or equal to the upper limit of the output parameter.

Since the execution instruction corresponds to the output parameter, the execution instruction is determined depending on the upper limit of the output parameter. In the following description, the execution instruction corresponding to the upper limit of the output parameter is defined as an upper limit of the execution instruction in order to simplify expression. It can be seen that, the embodiment is different from the above embodiment in that the upper limit of the execution instruction is set based on the voltage amplitude, so that the output parameter of the electrolysis rectification power supply matches the power of the alternating current grid.

Figure 4:
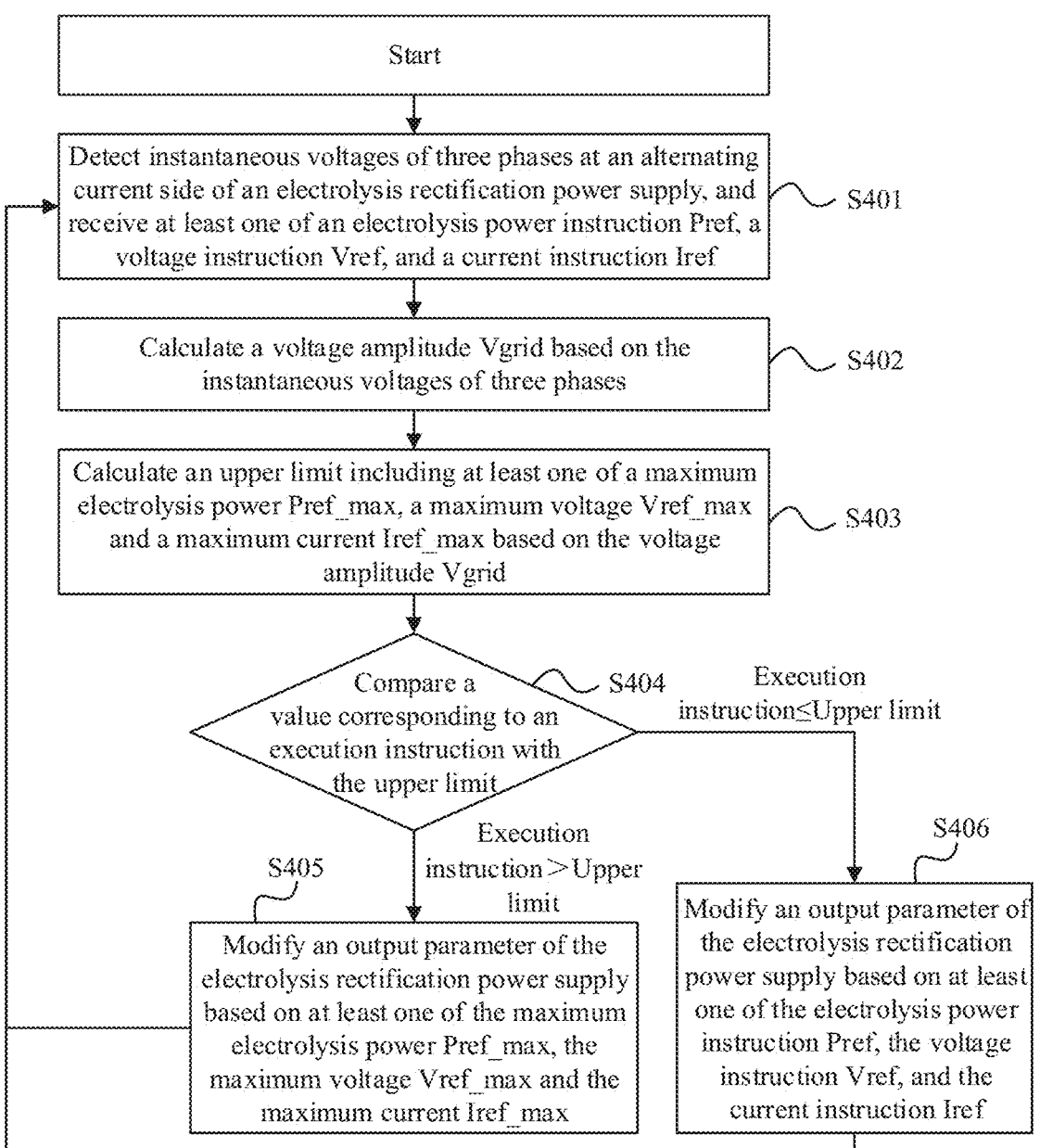
FIG. 4 is a flow chart illustrating a method for controlling an alternating current electrolysis system according to another embodiment of the present disclosure.

FIG. 4 is a flow chart illustrating a method for controlling an alternating current electrolysis system according to another embodiment of the present disclosure. As shown in FIG. 4, the method for controlling an alternating current electrolysis system includes the following steps S401 to S406.

In step S401, instantaneous voltages of three phases at an alternating current side of an electrolysis rectification power supply are detected, and at least one of an electrolysis power instruction Pref, a voltage instruction Vref, and a current instruction Iref is received.

In step S402, a voltage amplitude Vgrid is calculated based on the instantaneous voltages of the three phases.

In step S403, an upper limit (including at least one of a maximum electrolysis power Pref_max, a maximum voltage Vref_max and a maximum current Iref_max) is calculated based on the voltage amplitude Vgrid.

In step S404, a value of an execution instruction is compared with the upper limit. In a case that the value of the execution instruction is greater than the upper limit, step S405 is performed. Otherwise, step S406 is performed.

In step S405, an output parameter of the electrolysis rectification power supply is modified based on at least one of the maximum electrolysis power Pref_max, the maximum voltage Vref_max and the maximum current Iref_max.

In step S406, the output parameter of the electrolysis rectification power supply is modified based on at least one of the electrolysis power instruction Pref, the voltage instruction Vref, and the current instruction Iref.

It can be seen from steps S401 to S406 that in the embodiment of the present disclosure, the value of the execution instruction is compared with the upper limit, and the output parameter of the electrolysis rectification power supply is modified depending on the comparison result, so that the electrolysis rectification power supply can stably operate while the electrolysis power of the electrolysis station matches the power of the alternating current grid.

In the above embodiment, the voltage amplitude and the upper limit of the output parameter form a monotone nondecreasing function, and therefore the upper limit of the output parameter is calculated by substituting the voltage amplitude into the monotone nondecreasing function. For example, a coefficient in the monotone nondecreasing function depends on the rated value of the voltage amplitude and a rated value of the output parameter.

For example, the upper limit is the maximum electrolysis power Pref_max. A relationship between the voltage amplitude Vgrid and the electrolysis power instruction Pref or the maximum electrolysis power Pref_max may be represented as a function function2: Pref=function2(Vgrid), or Pref_max=function2(Vgrid).

The function function2 is a monotone nondecreasing function. That is, the voltage amplitude Vgrid is in one to one correspondence with the electrolysis power instruction Pref (or the maximum electrolysis power Pref_max). There is a relationship of Pref=Vgrid/Vgrid_N*Pref_N, the maximum electrolysis power is equal to Pref_N, and a minimum electrolysis power is equal to 0. Vgird_N represents the rated value of the voltage amplitude Vgrid, and Pref_N represents the rate value corresponding to the electrolysis power instruction Pref.

It should be noted that in the above embodiments, the execution instruction may be manually set, or may be automatically calculated by a control system of the electrolysis station and then sent to the electrolysis rectification power supply, which is not limited in the present disclosure.

In an embodiment of the present disclosure, the output parameter is modified by: calculating a value corresponding to the execution instruction based on the voltage amplitude; and modifying the output parameter of the electrolysis rectification power supply based on the value corresponding to the execution instruction. The embodiment is different from each of the above embodiments in that the value corresponding to the execution instruction is directly determined based on the voltage amplitude, so that the output parameter of the electrolysis rectification power supply adapts to the alternating current grid.

Figure 5:
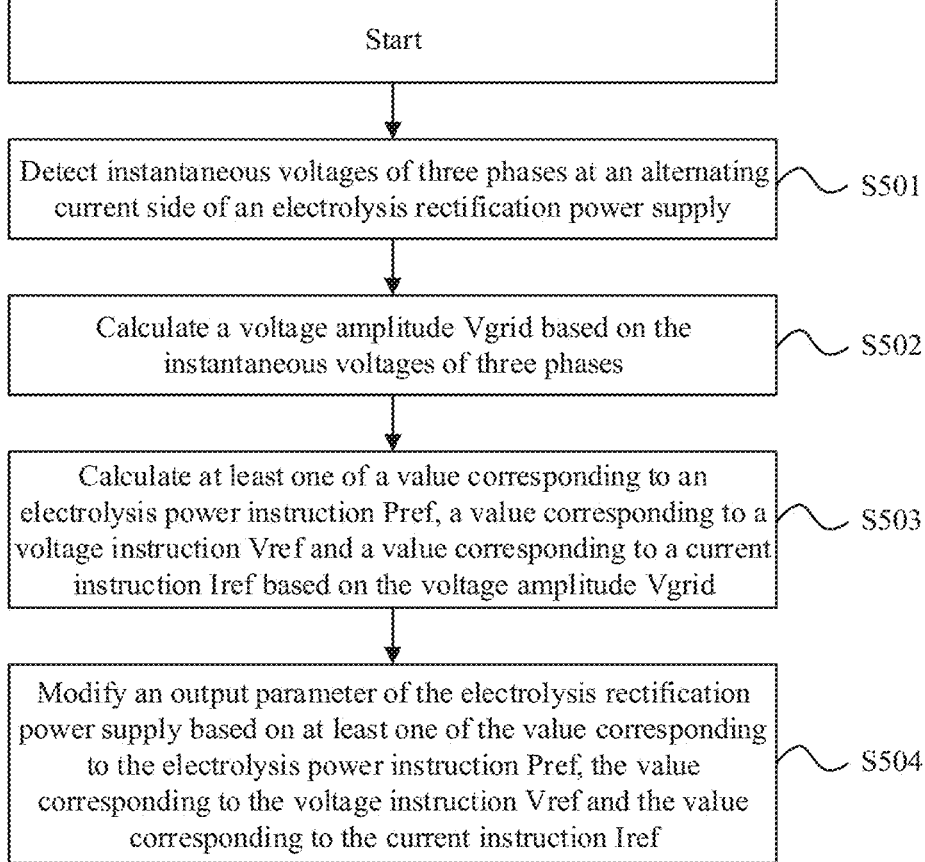
FIG. 5 is a flow chart illustrating a method for controlling an alternating current electrolysis system according to another embodiment of the present disclosure.

FIG. 5 is a flow chart illustrating a method for controlling an alternating current electrolysis system according to another embodiment of the present disclosure. As shown in FIG. 5, the method for controlling an alternating current electrolysis system includes the following steps S501 to S504.

In step S501, instantaneous voltages of three phases at an alternating current side of an electrolysis rectification power supply are detected.

In step S502, a voltage amplitude Vgrid is calculated based on the instantaneous voltages of the three phases.

In step S503, at least one of a value corresponding to an electrolysis power instruction Pref, a value corresponding to a voltage instruction Vref and a value corresponding to a current instruction Iref is calculated based on the voltage amplitude Vgrid.

In step S504, an output parameter of the electrolysis rectification power supply is modified based on at least one of the value corresponding to the electrolysis power instruction Pref, the value corresponding to the voltage instruction Vref and the value corresponding to the current instruction Iref.

It can be seen from steps S501 to S504 that in the embodiment of the present disclosure, the value corresponding to the execution instruction is directly determined based on the voltage amplitude Vgrid, and the output parameter of the electrolysis rectification power supply is modified depending on the value corresponding to the execution instruction, so that the electrolysis rectification power supply can stably operate while the electrolysis power of the electrolysis station matches the power of the alternating current grid.

Figure 6:
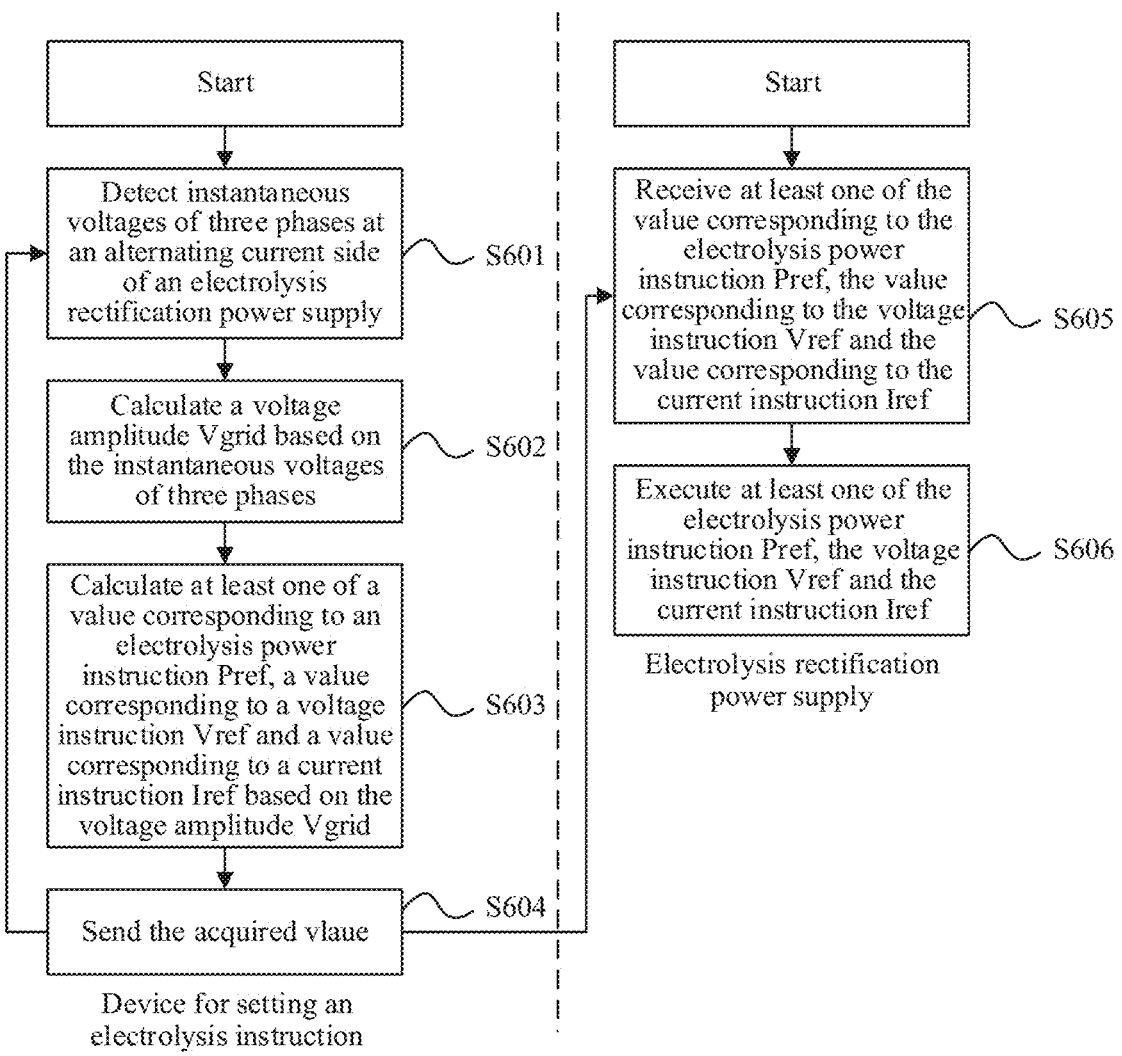
FIG. 6 is a flow chart illustrating a method for controlling an alternating current electrolysis system according to another embodiment of the present disclosure.

FIG. 6 is a flow chart illustrating a method for controlling an alternating current electrolysis system according to another embodiment of the present disclosure. As shown in FIG. 6, the method for controlling an alternating current electrolysis system includes the following steps S601 to S606.

In step S601, instantaneous voltages of three phases at an alternating current side of an electrolysis rectification power supply are detected.

In step S602, a voltage amplitude Vgrid is calculated based on the instantaneous voltages of the three phases.

In step S603, at least one of a value corresponding to an electrolysis power instruction Pref, a value corresponding to a voltage instruction Vref and a value corresponding to a current instruction Iref is calculated based on the voltage amplitude Vgrid.

In step S604, the calculated value is sent.

In step S605, at least one of at least one of the value corresponding to the electrolysis power instruction Pref, the value corresponding to the voltage instruction Vref and the value corresponding to the current instruction Iref is received.

In step S606, at least one of the electrolysis power instruction Pref, the voltage instruction Vref and the current instruction Iref is executed.

It can be seen from FIGS. 5 and 6 that the value corresponding to the execution instruction may be calculated by a device for setting an electrolysis instruction or a device for controlling the electrolysis rectification power supply. The execution instruction is executed by the device for controlling the electrolysis rectification power supply.

In an embodiment, the voltage amplitude and the value corresponding to the execution instruction form a monotone nondecreasing function. The value corresponding to the execution instruction is calculated by substituting the voltage amplitude into the monotone nondecreasing function. In an embodiment, the output parameter includes at least one of an output power, an output voltage and an output current.

Figure 7:
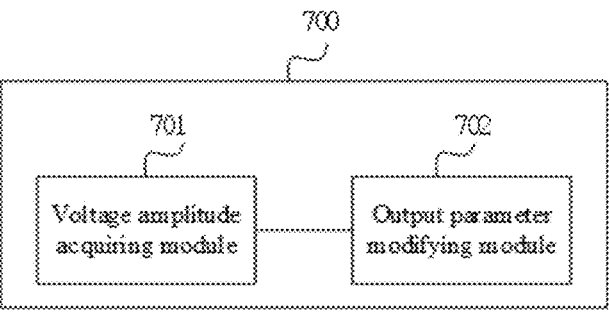
FIG. 7 is a schematic structural diagram illustrating a device for controlling an alternating current electrolysis system according to an embodiment of the present disclosure.

A device for controlling an alternating current electrolysis system is further provided according to an embodiment of the present disclosure. The device may be implemented by software and/or hardware, and is configured to perform the method for controlling an alternating current electrolysis system according to any one of the embodiments of the present disclosure. The device has the same technical principles and effects as the method, and therefore is not described in detail herein. FIG. 7 is a schematic structural diagram illustrating a device for controlling an alternating current electrolysis system according to an embodiment of the present disclosure. As shown in FIG. 7, the device 700 for controlling an alternating current electrolysis system includes a voltage amplitude acquiring module 701, and an output parameter modifying module 702.

The voltage amplitude acquiring module 701 is configured to acquire a voltage amplitude at an alternating current side of an electrolysis rectification power supply.

The output parameter modifying module 702 is configured to modify an output parameter of the electrolysis rectification power supply based on the voltage amplitude.

In an embodiment, the voltage amplitude acquiring module is further configured to detect instantaneous voltages of three phases at the alternating current side of the electrolysis rectification power supply; and calculate the voltage amplitude based on the instantaneous voltages of the three phases.

In an embodiment, the device for controlling an alternating current electrolysis system further includes an instruction acquiring module. The instruction acquiring module is configured to acquire an execution instruction for the electrolysis rectification power supply and an actual instruction at a previous cycle. The output parameter modifying module is further configured to: set a first threshold and a second threshold, where the first threshold is greater than the second threshold; modify the output parameter of the electrolysis rectification power supply based on the execution instruction in a case that the voltage amplitude is greater than or equal to the first threshold; modify the output parameter of the electrolysis rectification power supply based on the actual instruction at the previous cycle in a case that the voltage amplitude ranges between the first threshold and the second threshold; and modify the output parameter of the electrolysis rectification power supply to be less than an output parameter at the previous cycle in a case that the voltage amplitude is less than the second threshold.

In an embodiment, the device for controlling an alternating current electrolysis system further includes an instruction acquiring module. The instruction acquiring module is configured to acquire an execution instruction for the electrolysis rectification power supply. The output parameter modifying module is further configured to: set a first threshold; modify the output parameter of the electrolysis rectification power supply based on the execution instruction in a case that the voltage amplitude is greater than or equal to the first threshold; and modify the output parameter of the electrolysis rectification power supply to be less than an output parameter at a previous cycle in a case that the voltage amplitude is less than the first threshold.

In an embodiment, the output parameter of the electrolysis rectification power supply is modified to be less than the output parameter at the previous cycle by: modifying the execution instruction with an actual instruction at the previous cycle as a reference, so as to modify the output parameter of the electrolysis rectification power supply to be less than the output parameter at the previous cycle; and/or modifying a duty cycle of a PWM signal received by the electrolysis rectification power supply, to modify the output parameter of the electrolysis rectification power supply to be less than the output parameter at the previous cycle, where the actual instruction at the previous cycle and the execution instruction each are converted into the PWM signal so as to control the electrolysis rectification power supply.

In an embodiment, both the execution instruction and the duty cycle of the PWM signal are modified, and the one based on which the output parameter of the electrolysis rectification power supply is modified to be smaller prevails.

In an embodiment, the duty cycle of the PWM signal is determined as follows. In a case that the electrolysis rectification power supply is a voltage source rectifier and the duty cycle of the PWM signal is constant, the voltage amplitude and the output voltage of the electrolysis rectification power supply form a first monotone nondecreasing function, the duty cycle of the PWM signal and the voltage amplitude form a first monotone nonincreasing function, and therefore the duty cycle of the PWM signal is calculated by substituting the voltage amplitude into the first monotone nonincreasing function. In a case that the electrolysis rectification power supply is the voltage source rectifier and the duty cycle of the PWM signal is constant, the voltage amplitude and the output voltage of the electrolysis rectification power supply form a second monotone nonincreasing function, the duty cycle of the PWM signal and the voltage amplitude form a second monotone nondecreasing function, and therefore duty cycle of the PWM signal is calculated by substituting the voltage amplitude into the second monotone nondecreasing function. In a case that the electrolysis rectification power supply is the current source rectifier and the duty cycle of the PWM signal is constant, the voltage amplitude and the output current of the electrolysis rectification power supply form a third monotone nondecreasing function, the duty cycle of the PWM signal and the voltage amplitude form a third monotone nonincreasing function, and therefore the duty cycle of the PWM signal is calculated by substituting the voltage amplitude into the third monotone nonincreasing function. In a case that the electrolysis rectification power supply is the current source rectifier and the duty cycle of the PWM signal is constant, the voltage amplitude and the output current of the electrolysis rectification power supply form a fourth monotone nonincreasing function, the duty cycle of the PWM signal and the voltage amplitude form a fourth monotone nondecreasing function, and therefore the duty cycle of the PWM signal is calculated by substituting the voltage amplitude into the fourth monotone nondecreasing function.

In an embodiment, the method for controlling an alternating current electrolysis system further includes acquiring an execution instruction for the electrolysis rectification power supply. The output parameter is modified by: calculating an upper limit of the output parameter based on the voltage amplitude; controlling the electrolysis rectification power supply to output the upper limit of the output parameter in a case that an output parameter corresponding to the execution instruction is greater than the upper limit of the output parameter; and modifying the output parameter of the electrolysis rectification power supply based on the execution instruction in a case that an output parameter corresponding to the execution instruction is less than or equal to the upper limit of the output parameter.

In an embodiment, the voltage amplitude and the upper limit of the output parameter form a monotone nondecreasing function. The upper limit of the output parameter is calculated by substituting the voltage amplitude into the monotone nondecreasing function.

In an embodiment, the output parameter is modified by: calculating a value corresponding to the execution instruction based on the voltage amplitude; and modifying the output parameter of the electrolysis rectification power supply based on the value corresponding to the execution instruction.

In an embodiment, the voltage amplitude and the value corresponding to the execution instruction form a monotone nondecreasing function; and the value corresponding to the execution instruction is calculated by substituting the voltage amplitude into the monotone nondecreasing function.

In an embodiment, a coefficient in the monotone nondecreasing function depends on a rated value of the voltage amplitude and a rated value of the output parameter.

In an embodiment, the output parameter includes at least one of an output power, an output voltage and an output current.

The device may perform the method according to any one of the embodiments of the present disclosure, and has functional modules and beneficial effects corresponding to the method.

Figure 8:
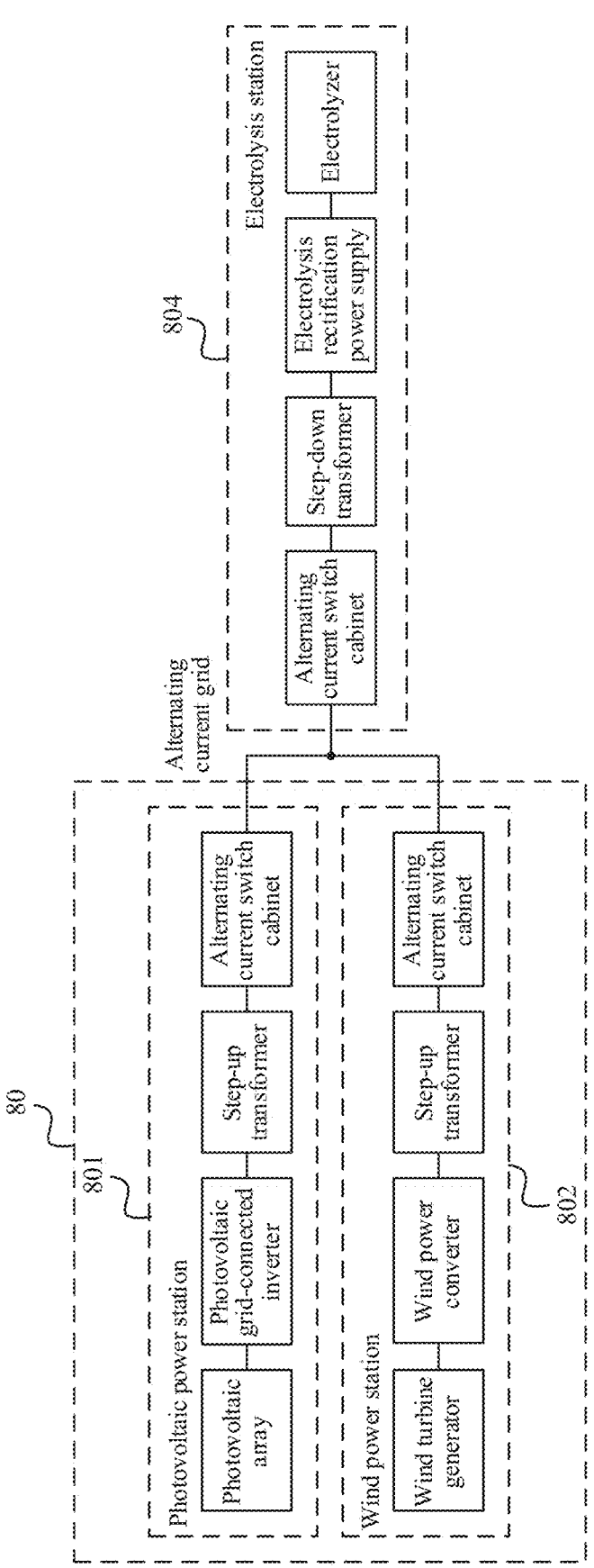
FIG. 8 is a schematic structural diagram illustrating an alternating current electrolysis system according to an embodiment of the present disclosure.

Based on the above embodiments, an alternating current electrolysis system is further provided according to an embodiment of the present disclosure. FIG. 8 is a schematic structural diagram illustrating an alternating current electrolysis system according to an embodiment of the present disclosure. As shown in FIG. 8, the alternating current electrolysis system includes: a renewable energy power station 80 and an electrolysis station 804. The electrolysis station 804 includes an electrolyzer, an electrolysis rectification power supply and a controller. The electrolysis rectification power supply is connected between the renewable energy power station 80 and the electrolyzer. For example, the electrolysis station 804 may further include a hydrogen production device such as a post-treatment and purification device. The controller is configured to perform the method for controlling an alternating current electrolysis system according to any one of the embodiments of the present disclosure, has the same beneficial effects as the method, and thus is not described in detail herein.

The renewable energy power station 80 may be a photovoltaic power station 801 or a wind power station 802. The electrolysis station 804 is a station powered by direct current power for performing electrolysis. For example, the electrolysis station 804 may be configured to perform electrolysis to produce hydrogen, copper, and the like.

A power generated by the photovoltaic power station 801 varies with light intensity, and a power generated by the wind power station 802 varies with wind power, and therefore the electrolysis station 804 fails to acquire an output power of the photovoltaic power station 801 and an output power of the wind power station 802 in real time due to a delay of communication transmission, which easily results in the unbalanced power of the alternating current electrolysis system and then oscillations of the alternating current grid.

The controller performs the method for controlling an alternating current electrolysis system according to any one of the embodiments of the present disclosure, so that electrolysis rectification power supply modifies, following a control strategy, an electrolysis power, a voltage and/or a current based on the voltage amplitude of the alternating current grid, thereby effectively solving the problems of the unbalanced power of the alternating current electrolysis system and the oscillations of the alternating current grid.

As shown in FIG. 8, the renewable energy power station 80 includes at least one of the photovoltaic power station 801 and the wind power station 802.

In the renewable energy power station 80, only the photovoltaic power station 801 or the wind power station 802 may operate, or both the photovoltaic power station 801 and the wind power station 802 operate. The photovoltaic power station 801 includes a photovoltaic array, a photovoltaic grid-connected inverter, a step-up transformer and an alternating current switch cabinet. The photovoltaic array may directly convert solar radiation into direct current power. Multiple photovoltaic arrays are arranged to form a photovoltaic matrix. The photovoltaic grid-connected inverter converts of the direct current power outputted by the photovoltaic arrays into high-frequency three-phase voltage. The high-frequency three-phase voltage is boosted by the step-up transformer, and then the boosted voltage is transmitted to the alternating current switch cabinet. The wind power station 802 includes a wind turbine generator, a wind power converter, a step-up transformer and an alternating current switch cabinet. The wind turbine generator may be a direct current wind turbine generator or an alternating current wind turbine generator. The direct current wind turbine generator converts wind energy into direct current power, and a wind power converter corresponding to the direct current wind turbine generator converts the direct current power outputted by the direct current wind turbine generator into alternating current power matching the power grid. The alternating current wind turbine generator converts wind energy into alternating current power, a wind power converter corresponding to the alternating current wind turbine generator converts the alternating current power outputted by the alternating current wind turbine generator into alternating current power matching the power grid. The alternating current power matching the power grid is boosted by a step-up transformer, and then the boosted voltage is transmitted to the alternating current switch cabinet. The renewable energy power station 80 including the photovoltaic power station 801 and the wind power station 802 supplies the alternating current voltage to the electrolysis rectification power supply, for the electrolysis rectification power supply to operate.

As shown in FIG. 8, in an embodiment, the electrolysis station 804 further includes an alternating current switch cabinet and a transformer that are connected in series between the renewable energy power station 80 and the electrolysis rectification power supply.

The voltage amplitude is one of an amplitude of an alternating current voltage at an input end of the alternating current switch cabinet, an amplitude of an alternating current voltage at a primary side of the transformer, and amplitude of a voltage at a secondary side of the transformer.

Based on the above embodiments, in an embodiment, the electrolysis station 804 includes the alternating current switch cabinet, a step-down transformer, an electrolysis rectification power supply and an electrolyzer. The power of the alternating current grid is transmitted by the renewable energy power station 80 to the alternating current switch cabinet of the electrolysis station 804, then is stepped down by the step-down transformer, and finally is transmitted to the electrolysis rectification power supply, so as to control the electrolyzer to operate.

The voltage amplitude may be the amplitude of the alternating current voltage at the input end of the alternating current switch cabinet, that is, an amplitude of an output voltage of the renewable energy power station. Alternatively, the voltage amplitude may be the amplitude of the alternating current voltage at the primary side of the transformer, that is, an amplitude of an output voltage of the alternating current switch cabinet of the electrolysis station. Alternatively, the voltage amplitude may be the amplitude of the voltage at the secondary side of the transformer, that is, an amplitude of the stepped down voltage. It can be seen that in the embodiment of the present disclosure, the voltage amplitude can be locally acquired in the electrolysis station. therefore, it is unnecessarily to transmit information acquired by the photovoltaic power station and the wind power station to the electrolysis station through network communication, and the like. Therefore, according to the embodiment of the present disclosure, the problem of untimely modification due to communication delay can be avoided, and the communication cost can be reduced.

Figure 9:
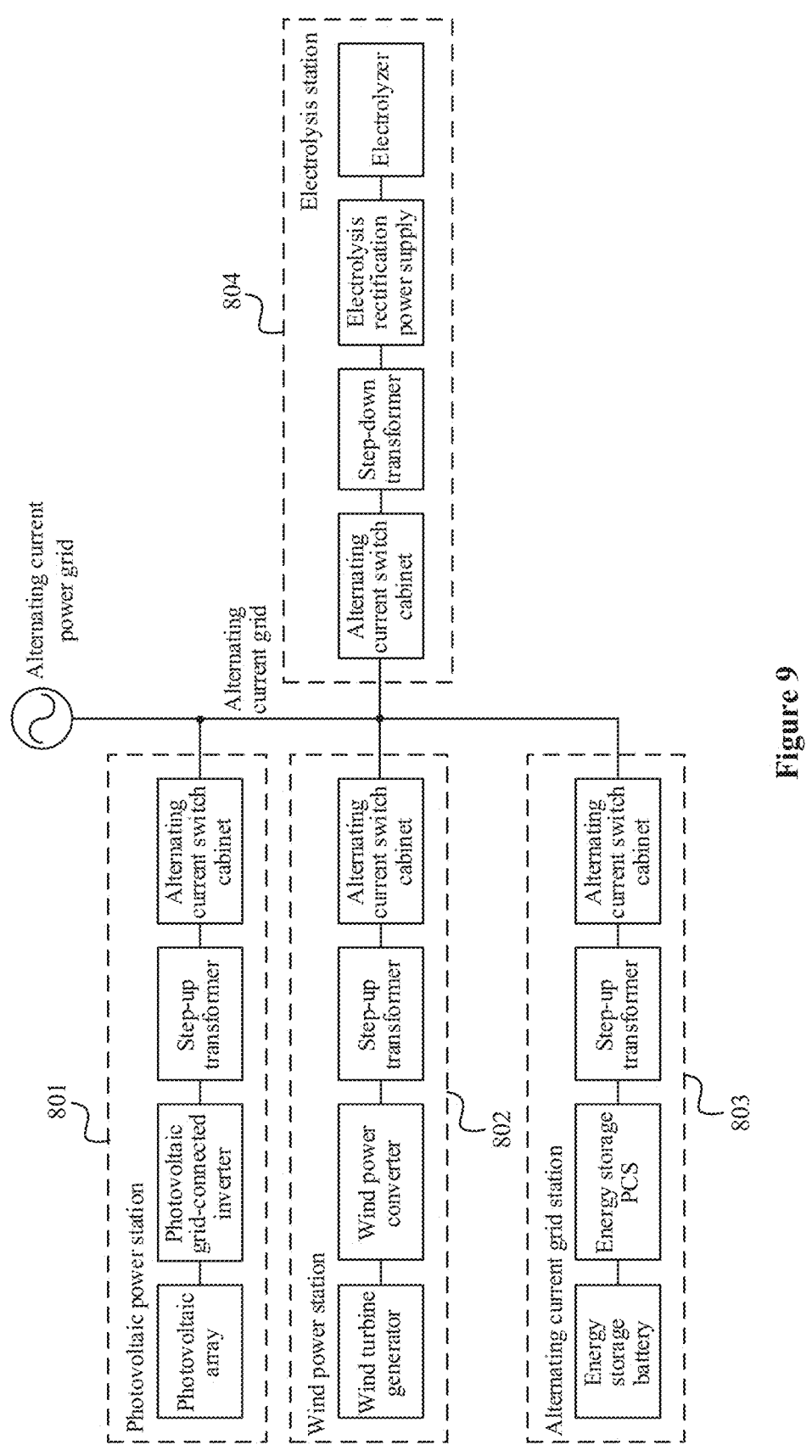
FIG. 9 is a schematic structural diagram illustrating an alternating current electrolysis system according to another embodiment of the present disclosure.

FIG. 9 is a schematic structural diagram illustrating an alternating current electrolysis system according to another embodiment of the present disclosure. As shown in FIG. 9, the alternating current electrolysis system is a grid-connected electrolysis system, and is powered by an alternating current power grid. Further, a renewable energy power station such as the photovoltaic power station and the wind power station, and an energy storage device may be connected to the alternating current electrolysis system in the alternating current grid. The photovoltaic power station 801, the wind power station 802, and an alternating current grid station 803 are connected to the alternating current power grid. The alternating current electrolysis system is powered by the power grid, and therefore is supplied with a stable voltage and a stable frequency. The electrolysis rectification power supply may supply a constant power for electrolysis, or may supply a variable power depending on the renewable energy power for electrolysis.

It should be noted that the alternating current grid station 803 includes an energy storage battery, an energy storage PCS, a step-up transformer and an alternating current switch cabinet. The energy storage PCS is configured to control charging and discharging of the energy storage battery, perform alternating current to direct current or direct current to alternating current conversion, and directly supply power to an alternating current load without a power grid.

Figure 10:
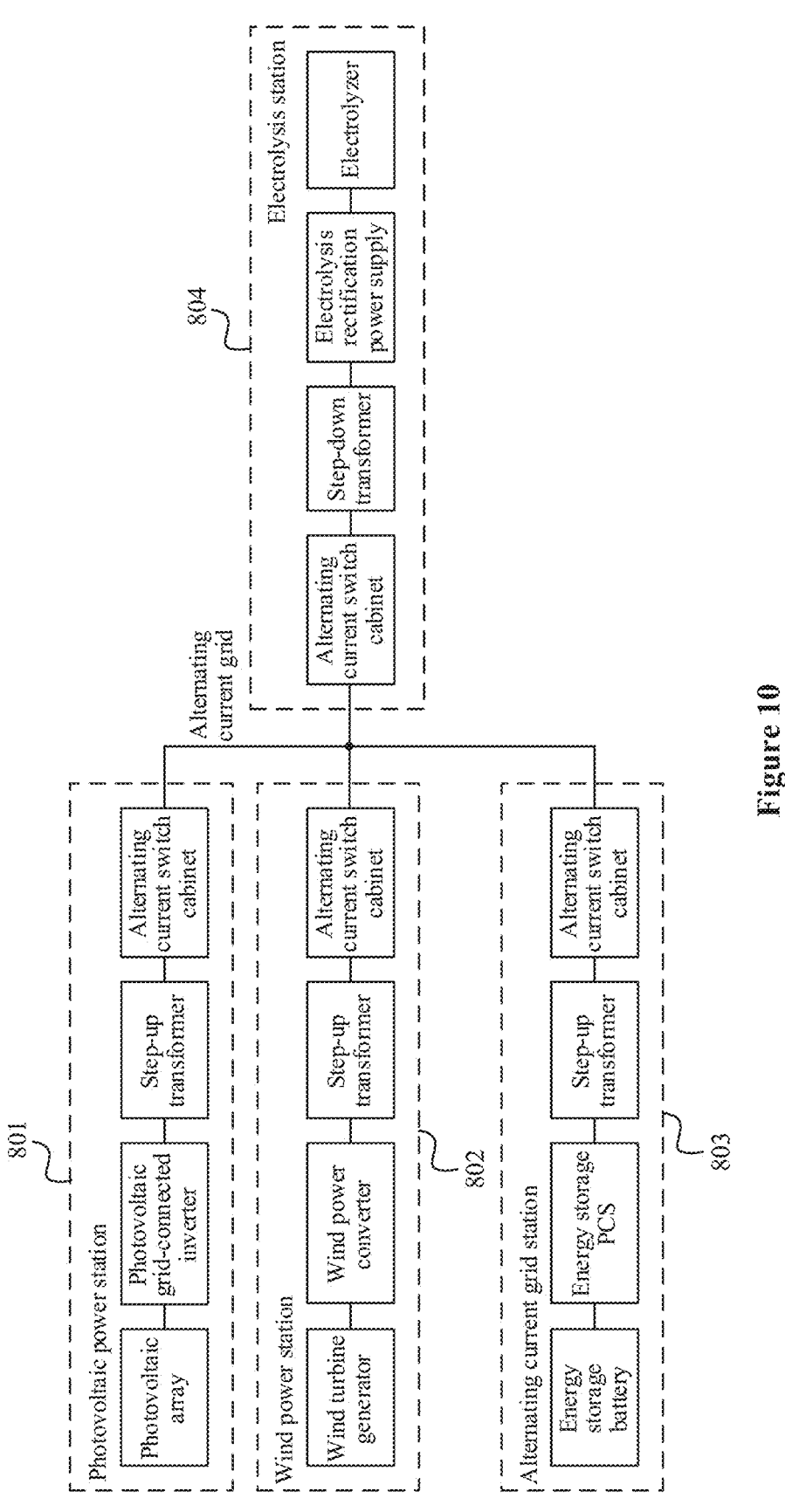
FIG. 10 is a schematic structural diagram illustrating an alternating current electrolysis system according to another embodiment of the present disclosure.

FIG. 10 is a schematic structural diagram illustrating an alternating current electrolysis system according to another embodiment of the present disclosure. As shown in FIG. 10, the alternating current electrolysis system is a micro-grid electrolysis system, and includes a photovoltaic power station 801, a wind power station 802 and an alternating current grid station 803. The solar energy as an input of the renewable energy power station, the energy storage battery stores energy, and the energy storage PCS operates, such that the alternating current grid is formed. The photovoltaic grid-connected inverter and the wind power converter operate, so as to generate power for the grid, and the electrolysis rectification power supply operates. The electrolysis rectification power supply normally performs electrolysis at a variable power depending on renewable energy sources such as the solar energy and the wind energy. During this process, the energy storage device is configured to stabilize the voltage and frequency of the power grid, as well as lower a peak and heighten a trough for the power.

In summary, the method for controlling an alternating current electrolysis system according to the embodiments of the present disclosure has a wide range of application, and can not only be applied to an alternating current micro-grid system and an alternating current grid-connected system that have a small fluctuation in the power, but also to an alternating current grid system with a large fluctuation in the power. Therefore, according to the embodiments of the present disclosure, the electrolysis rectification power supply can be timely controlled to adapt to a fluctuation in the power of the alternating current grid, so as to solve the problem of the oscillation of the power grid due to the unbalanced power of the alternating current electrolysis system, thereby facilitating normal operation of the electrolysis station.

It should be noted that the above descriptions show only some preferred embodiments and technical principles of the present disclosure. Those skilled in the art should understand that the present disclosure is not limited to the embodiments described above. Those skilled in the art may make various variations, modifications and substitutions without departing from the protection scope of the present disclosure. Therefore, although the present disclosure is described in detail with the above embodiments, the present disclosure is not limited to the above embodiments. The present disclosure may further include more other equivalent embodiments without departing from the concept of the present disclosure, and the present disclosure should fall within the scope of the claims.

The invention claimed is:

1. A method for controlling an alternating current electrolysis system, comprising:
    acquiring an execution instruction for the electrolysis rectification power supply and an actual instruction at a previous cycle for the electrolysis rectification power supply;
    acquiring a voltage amplitude at an alternating current side of an electrolysis rectification power supply; and
    modifying an output parameter of the electrolysis rectification power supply based on the voltage amplitude;
    wherein the modifying of the output parameter comprises:
    setting a first threshold;
    modifying the output parameter of the electrolysis rectification power supply based on the execution instruction in response to the voltage amplitude being greater than the first threshold; and
    modifying the output parameter of the electrolysis rectification power supply to be less than or equal to an output parameter at the previous cycle in response to the voltage amplitude being less than the first threshold.

2. The method for controlling an alternating current electrolysis system according to claim 1,
    wherein the modifying of the output parameter comprises:
    setting a second threshold, wherein the first threshold is greater than the second threshold;
    modifying the output parameter of the electrolysis rectification power supply based on the actual instruction at the previous cycle in response to the voltage amplitude being between the first threshold and the second threshold; and
    modifying the output parameter of the electrolysis rectification power supply to be less than the output parameter at the previous cycle in response to the voltage amplitude being less than the second threshold.

3. The method for controlling an alternating current electrolysis system according to claim 1, wherein the modifying of the output parameter further comprises:
    modifying the output parameter of the electrolysis rectification power supply based on either the execution instruction or the actual instruction at the previous cycle in response to the voltage amplitude being equal to the first threshold.

4. The method for controlling an alternating current electrolysis system according to claim 2, wherein the step of modifying the output parameter of the electrolysis rectification power supply to be less than or equal to an output parameter at the previous cycle comprises at least one of:
    modifying the execution instruction with the actual instruction at the previous cycle as a reference, to modify the output parameter of the electrolysis rectification power supply to be less than the output parameter at the previous cycle; and
    modifying a duty cycle of a pulse width modulation (PWM) signal received by the electrolysis rectification power supply, to modify the output parameter of the electrolysis rectification power supply to be less than the output parameter at the previous cycle, wherein the actual instruction at the previous cycle and the execution instruction each is converted into the PWM signal to control the electrolysis rectification power supply.

5. The method for controlling an alternating current electrolysis system according to claim 4, wherein one of the step of modifying the execution instruction and the step of modifying a duty cycle of a PWM signal based on which the output parameter of the electrolysis rectification power supply is modified to be smaller prevails.

6. The method for controlling an alternating current electrolysis system according to claim 4, wherein the duty cycle of the PWM signal is determined by one of:
    calculating the duty cycle of the PWM signal by substituting the voltage amplitude into a first monotone nonincreasing function, wherein the electrolysis rectification power supply is a voltage source rectifier, the duty cycle of the PWM signal is constant, the voltage amplitude and an output voltage of the electrolysis rectification power supply form a first monotone nondecreasing function, and the duty cycle of the PWM signal and the voltage amplitude form the first monotone nonincreasing function;
    calculating the duty cycle of the PWM signal by substituting the voltage amplitude into a second monotone nondecreasing function, wherein the electrolysis rectification power supply is a voltage source rectifier, the duty cycle of the PWM signal is constant, the voltage amplitude and an output voltage of the electrolysis rectification power supply form a second monotone nonincreasing function, and the duty cycle of the PWM signal and the voltage amplitude form the second monotone nondecreasing function;
    calculating the duty cycle of the PWM signal by substituting the voltage amplitude into a third monotone nonincreasing function, wherein the electrolysis rectification power supply is the current source rectifier, the duty cycle of the PWM signal is constant, the voltage amplitude and an output current of the electrolysis rectification power supply form a third monotone nondecreasing function, and the duty cycle of the PWM signal and the voltage amplitude form the third monotone nonincreasing function; and
    calculating the duty cycle of the PWM signal by substituting the voltage amplitude into a fourth monotone nondecreasing function, wherein the electrolysis rectification power supply is the current source rectifier, the duty cycle of the PWM signal is constant, the voltage amplitude and an output current of the electrolysis rectification power supply form a fourth monotone nonincreasing function, and the duty cycle of the PWM signal and the voltage amplitude form the fourth monotone nondecreasing function.

7. The method for controlling an alternating current electrolysis system according to claim 1,
   wherein the step of modifying an output parameter further comprises:
   calculating an upper limit of the output parameter based on the voltage amplitude;
   controlling the electrolysis rectification power supply to have an output at the upper limit of the output parameter in response to an output parameter corresponding to the execution instruction being greater than the upper limit of the output parameter; and
   modifying the output parameter of the electrolysis rectification power supply based on the execution instruction in response to an output parameter corresponding to the execution instruction being less than or equal to the upper limit of the output parameter.

8. The method for controlling an alternating current electrolysis system according to claim 7, wherein
   the voltage amplitude and the upper limit of the output parameter form a monotone nondecreasing function; and
   the upper limit of the output parameter is calculated by substituting the voltage amplitude into the monotone nondecreasing function.

9. The method for controlling an alternating current electrolysis system according to claim 1, wherein the step of modifying an output parameter further comprises:
   calculating a value corresponding to the execution instruction based on the voltage amplitude; and
   modifying the output parameter of the electrolysis rectification power supply based on the value corresponding to the execution instruction.

10. The method for controlling an alternating current electrolysis system according to claim 9, wherein
   the voltage amplitude and the value corresponding to the execution instruction form a monotone nondecreasing function; and
   the value corresponding to the execution instruction is calculated by substituting the voltage amplitude into the monotone nondecreasing function.

11. The method for controlling an alternating current electrolysis system according to claim 8, wherein
   the monotone nondecreasing function comprises coefficients depending on a rated value of the voltage amplitude and a rated value of the output parameter.

12. The method for controlling an alternating current electrolysis system according to claim 1, wherein the output parameter comprises at least one of an output power, an output voltage and an output current.

13. The method for controlling an alternating current electrolysis system according to claim 1, wherein the step of acquiring a voltage amplitude comprises:
   detecting instantaneous voltages of three phases at the alternating current side of the electrolysis rectification power supply; and
   calculating the voltage amplitude based on the instantaneous voltages of the three phases.

14. A device for controlling an alternating current electrolysis system, comprising:

an instruction acquiring module configured to acquire an execution instruction for the electrolysis rectification power supply and an actual instruction at a previous cycle for the electrolysis rectification power supply;
a voltage amplitude acquiring module configured to acquire a voltage amplitude at an alternating current side of an electrolysis rectification power supply; and
an output parameter modifying module configured to modify an output parameter of the electrolysis rectification power supply based on the voltage amplitude;
wherein the output parameter modifying module is further configured to:
set a first threshold;
modify the output parameter of the electrolysis rectification power supply based on the execution instruction in response to the voltage amplitude being greater than the first threshold; and
modify the output parameter of the electrolysis rectification power supply to be less than or equal to an output parameter at the previous cycle in response to the voltage amplitude being less than the first threshold.

15. An alternating current electrolysis system, comprising:
   a renewable energy power station; and
   an electrolysis station, comprising:
      an electrolyzer,
      an electrolysis rectification power supply connected between the renewable energy power station and the electrolyzer; and
      a controller configured to perform the method for controlling an alternating current electrolysis system according to claim 1.

16. The alternating current electrolysis system according to claim 15, wherein the renewable energy power station comprises at least one of a photovoltaic power station and a wind power station.

17. The alternating current electrolysis system according to claim 15, wherein the electrolysis station further comprises:
   an alternating current switch cabinet and a transformer that are connected in series between the renewable energy power station and the electrolysis rectification power supply, wherein the voltage amplitude is one of an amplitude of an alternating current voltage at an input end of the alternating current switch cabinet, an amplitude of an alternating current voltage at a primary side of the transformer, and an amplitude of a voltage at a secondary side of the transformer.

18. The method for controlling an alternating current electrolysis system according to claim 1, wherein the step of modifying the output parameter of the electrolysis rectification power supply to be less than or equal to an output parameter at the previous cycle comprises at least one of:
   modifying the execution instruction with an actual instruction at the previous cycle as a reference, to modify the output parameter of the electrolysis rectification power supply to be less than the output parameter at the previous cycle; and
   modifying a duty cycle of a PWM signal received by the electrolysis rectification power supply, to modify the output parameter of the electrolysis rectification power supply to be less than the output parameter at the previous cycle, wherein the actual instruction at the previous cycle and the execution instruction each is converted into the PWM signal to control the electrolysis rectification power supply.

19. The method for controlling an alternating current electrolysis system according to claim 10, wherein the monotone nondecreasing function comprises coefficients depending on a rated value of the voltage amplitude and a rated value of the output parameter.

20. The device according to claim 14, wherein the output parameter modifying module is further configured to:

set a second threshold, wherein the first threshold is greater than the second threshold;

modify the output parameter of the electrolysis rectification power supply based on the actual instruction at the previous cycle in response to the voltage amplitude being between the first threshold and the second threshold; and modify the output parameter of the electrolysis rectification power supply to be less than the output parameter at the previous cycle in response to the voltage amplitude being less than the second threshold.

\* \* \* \* \*